E. L. ROBERGEL.
MACHINE FOR MAKING REINFORCED BICYCLE SPOKES.
APPLICATION FILED APR. 25, 1904.
924,582.
Patented June 8, 1909.
3 SHEETS—SHEET 1.
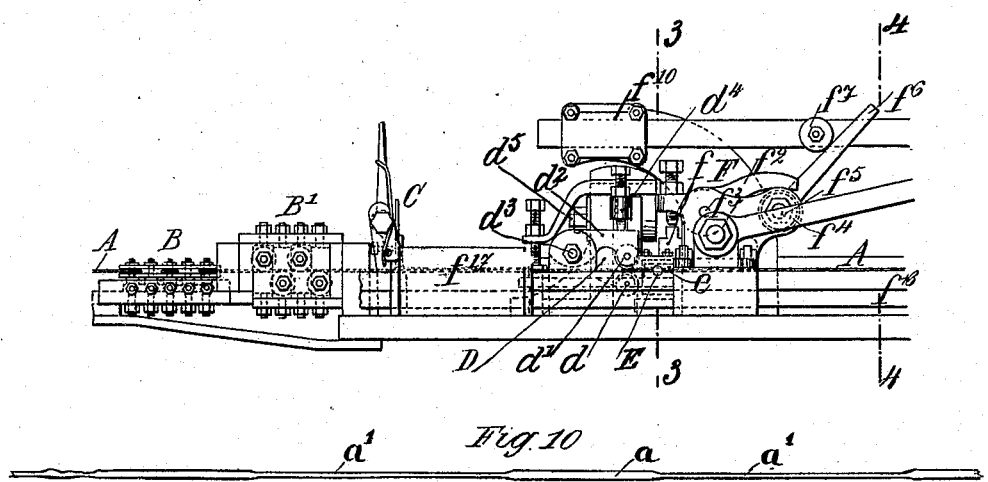
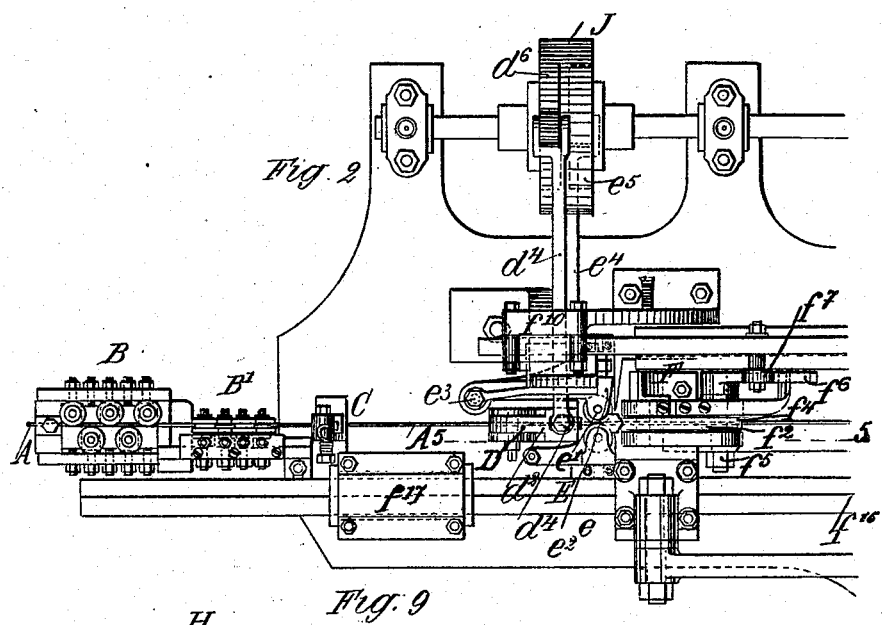
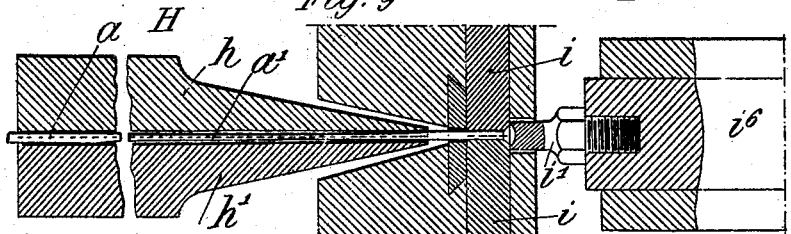
WITNESSES:
F. W. Wright
E. W. Collins
INVENTOR
Eugène Louis Robergel
BY Howson & Howson
ATTORNEYS.

E. L. ROBERGEL.
MACHINE FOR MAKING REINFORCED BICYCLE SPOKES.
APPLICATION FILED APR. 25, 1904.
924,582.
Patented June 8, 1909.
3 SHEETS—SHEET 2.
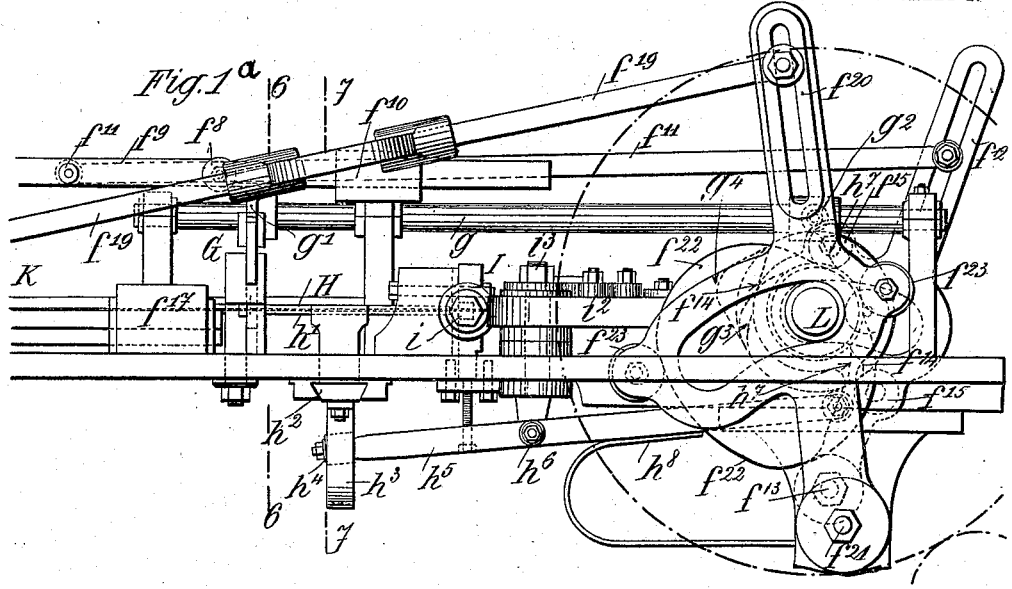
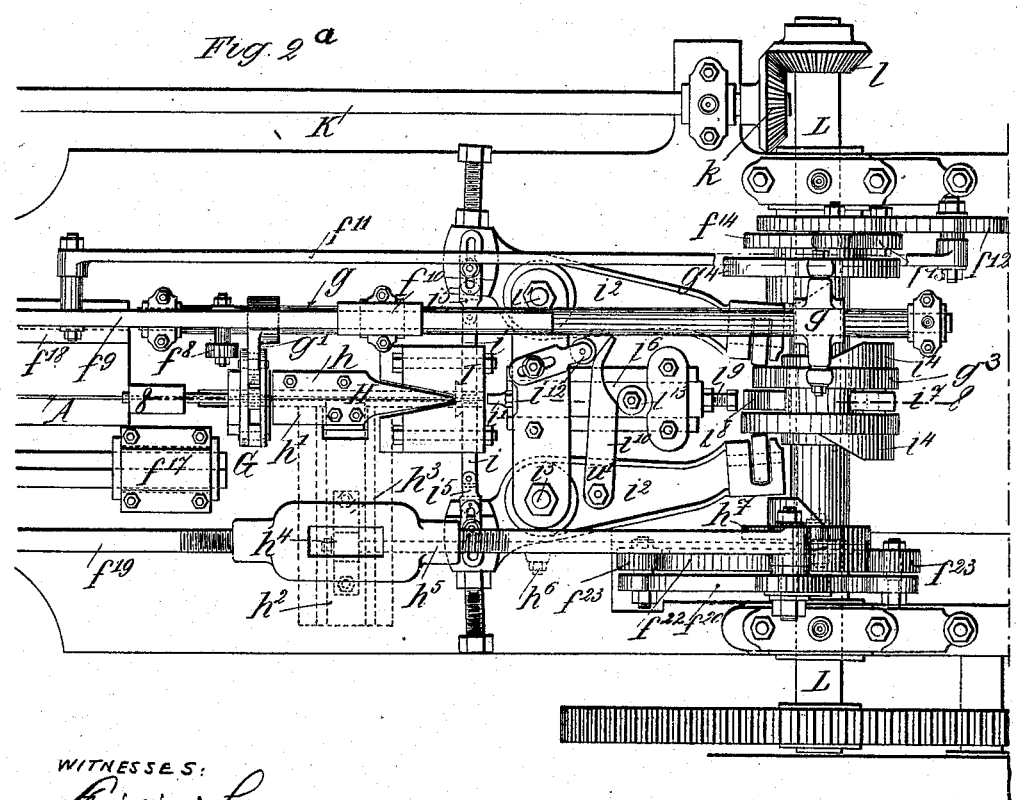
WITNESSES:
F. W. Wright
E. W. Collins
INVENTOR
Eugene Louis Robergel
By Howson & Howson,
ATTORNEYS.

E. L. ROBERGEL.
MACHINE FOR MAKING REINFORCED BICYCLE SPOKES.
APPLICATION FILED APR. 25, 1904.
924,582.
Patented June 8, 1909.
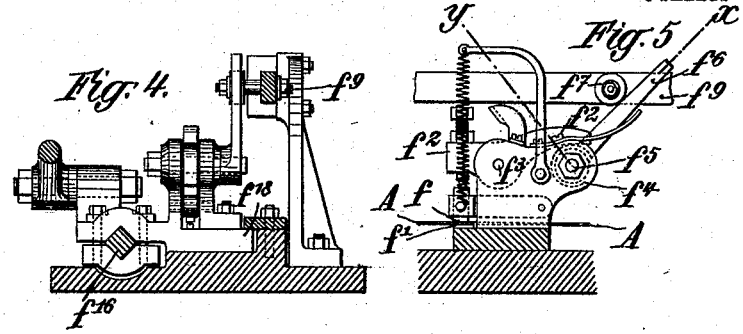
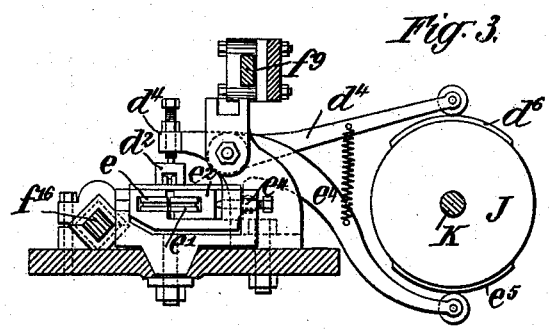
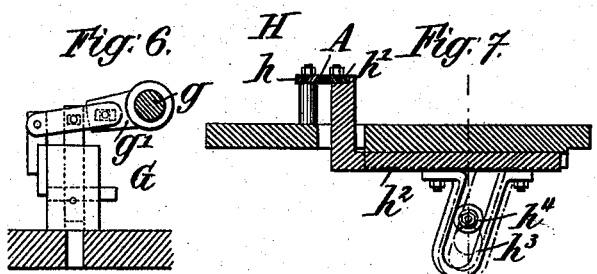
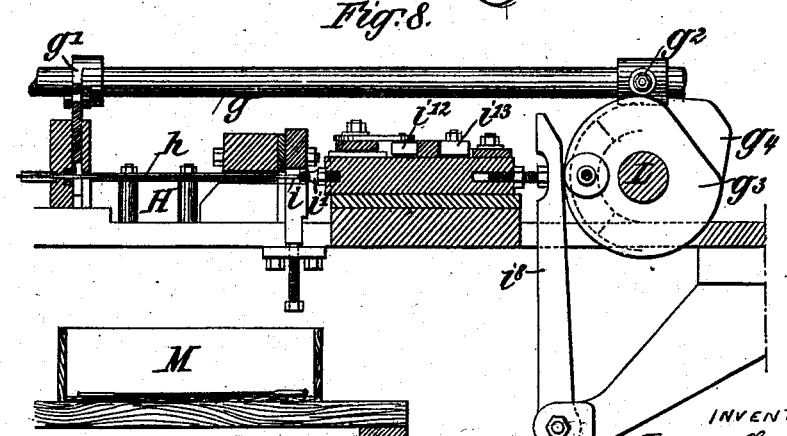

UNITED STATES PATENT OFFICE.

EUGÈNE LOUIS ROBERGEL, OF LA GUEROULDE, FRANCE.

MACHINE FOR MAKING REINFORCED BICYCLE-SPOKES.

No. 924,582.  Specification of Letters Patent.  Patented June 8, 1909.

Application filed April 25, 1904. Serial No. 204,877.

*To all whom it may concern:*

Be it known that I, EUGÈNE LOUIS ROBERGEL, a citizen of the Republic of France, residing in La Gueroulde, Department of Eure, France, have invented Improvements in Machines for Making Reinforced Bicycle-Spokes, of which the following is a specification.

This invention relates to a machine intended for the manufacture of spokes for the wheels of cycles of the kind termed reinforced spokes, that is to say of which the parts in proximity to the hub and the rim are thicker than the main body of the spoke and which comprise a head at the extremity which is fixed to the hub. This machine effects the manufacture of the spokes automatically, employing wire the section of which is equal to that of the thickest portions of the spoke.

Figure 1 shows part of the machine in elevation; Fig. 1ª shows the remaining part of the machine in elevation; Fig. 2 is a plan view of the part as shown in Fig. 1; Fig. 2ª is a plan view of the part as shown in Fig. 1ª; and Figs. 3, 4, 5, 6, 7 and 8 are cross sections on the lines 3—3, 4—4, 5—5, 6—6, 7—7 and 8—8 of Figs. 1 and 2, Fig. 9 is a horizontal section upon a larger scale of the mechanism for forming the head. Fig. 10 represents the portion of the wire which is in the machine.

The wire A corresponds in diameter to the reinforced portion of the spokes; it enters the machine between two successive series of rollers B and B¹ by which it is straightened, these two series of rollers acting in two perpendicular planes; the wire then passes into a part C acting in the manner of a pawl or cam and preventing it from being forced backward, then it enters two successive rolling devices D and E by which its diameter is reduced to that of the main body of the spoke; it is then engaged by pincers F by which it is drawn, then passes into a cutting device G, thence through a guide H and into the apparatus I serving to form the head of the spoke.

The two series of straightening rollers B B¹ (Figs. 1 and 2) act upon the wire successively in two planes at right angles and on leaving the series of rollers B¹ the straightened wire passes into the retaining part C and is then engaged in the rolling devices D and E; the first of these converts the wire of circular cross section into one of elliptical cross section and the second which acts at right angles to the first reconverts the elliptical section to a circular section of smaller diameter than at first; the wire A where it remains of its initial diameter will constitute what is termed the reinforced portion and the portion reduced in diameter by the rolling operations will form the main body of the spoke.

In Fig. 10 which represents the portion of the wire which is in the machine in operative condition, the parts which remain of the original diameter and which form the reinforcing parts are marked $a$ and the parts of reduced diameter forming the main body of the spoke are marked $a^1$.

The first rolling device D (Figs. 1, 2 and 3) comprises a roller $d$ mounted upon a fixed spindle and a second roller $d^1$ mounted at the extremity of a lever $d^2$ rocking around $d^3$, upon which the extremity of a lever $d^4$ oscillating around $d^5$ is able to act; this latter lever rests upon the periphery of a plate J comprising two cams one of which $d^6$ serves to operate this lever $d^4$. The extremity of the lever $d^4$ acting upon the lever $d^2$ is formed by a screw so that the pressure may be regulated. The rollers $d$ $d^1$ are formed with a groove of suitable cross section for converting the wire A of circular cross section into wire of elliptical cross section.

The rolling device E (Figs. 1, 2 and 3) which acts in succession to the foregoing, comprises two horizontal rollers $e$ and $e^1$, one of which $e$ is mounted upon a fixed support and the other $e^1$ at the extremity of a movable arm $e^2$ oscillating at $e^3$ and upon which is adapted to act the extremity of a lever $e^4$ rocking upon the pivot $e^3$ and resting upon the periphery of the plate J which comprises a cam $e^5$ serving to operate this lever $e^4$.

The cam plate J (Figs. 1, 2 and 3) is keyed upon a shaft K carrying a bevel pinion $k$ meshing with a bevel pinion $l$ fast upon the shaft L from which the various motions of the machine are taken.

On leaving the rolling devices D and E, the wire becomes engaged in a part F, Figs. 1, 2, 4 and 5, which constitutes a clamp or pincers seizing and displacing it during the rolling operation. This part comprises a movable jaw $f$ which presses the wire against a fixed jaw $f^1$; the movable jaw $f$ being submitted to the action of a lever $f^2$ rocking at $f^3$ and upon which acts a cam $f^4$ fast upon a shaft $f^5$ suitably journaled and provided with an arm $f^6$; according as this arm $f^6$ occupies the position $x$ or the position $y$ (Fig. 5), the movable jaw $f$ is closed or opened. The arm $f^6$ is operated by means of two tappets constituted by two rollers $f^7$ and $f^8$ mounted upon a bar $f^9$ displaceable longitudinally in slide ways $f^{10}$; this bar is actuated by a connecting rod $f^{11}$ the head of which is attached to a lever $f^{12}$ oscillating at $f^{13}$ and receiving a rocking movement from a cam $f^{14}$ mounted upon the main shaft L; this cam $f^{14}$ controls this rocking movement by acting successively upon two rollers $f^{15}$ $f^{15}$ rigid with the said lever.

The connecting rod $f^{11}$ is attached to the lever $f^{12}$ in a slot in this latter so that the amplitude of the displacement of the bar $f^9$ may be modified at will.

The pincers F are displaced in the longitudinal direction by the following means: (Figs. 1 and 2) they are fixed upon a bar $f^{16}$ of prismatic cross-section guided and sliding in slide ways $f^{17}$; this part, which is also guided upon the frame of the machine in a slide way $f^{18}$, is connected by a rod $f^{19}$ to a lever $f^{20}$ oscillating at $f^{21}$ and receiving an oscillatory movement from a cam $f^{22}$ mounted upon the main shaft L; this cam causes the rocking movement by acting successively upon two rollers $f^{23}$ $f^{23}$ rigid with the said lever $f^{20}$. The rod $f^{19}$ is mounted in the lever $f^{20}$ by means of a slot permitting of regulating the stroke of the pincers F and the connecting rod itself is made in two parts connected by means of a screw threaded sleeve, so that adjustment may be effected under all circumstances.

The shears G (Figs. 1ª, 2ª and 6) which may be of any suitable type is operated by means of a shaft $g$ carrying an arm $g^1$ articulated to the movable part of the shears; the shaft $g$, suitably supported, is provided with a transverse arm $g^2$ the extremities of which are provided with rollers and rest upon two cams $g^3$ $g^4$ fast upon the shaft L and which impart to this shaft $g$ a rocking movement.

The guide H is constituted by two parts which are hereinafter termed jaws but which do not exert any pressing action upon the wire; they are merely intended to guide it. One of these jaws $h$ is fixed; the other $h^1$ is movable (Figs. 1, 2, 7, 8 and 9); this jaw $h^1$ is displaceable in a slide way $h^2$ at right angles to the direction of the wire; it is provided upon its lower face with an oblique slot $h^3$ in which is engaged a roller $h^4$ on the extremity of a lever $h^5$ rocking at $h^6$ which receives a rocking movement from a cam $h^7$ keyed upon the main shaft L; a spring $h^8$ fixed upon the general framework tends to return the lever to the position in which the movable jaw $h^1$ is open.

The appliance I which forms the head of the spoke (Figs. 1, 2, 8 and 9), comprises two parts $i$ $i$ which surround the wire and a punch $i^1$ which upsets the extremity of the wire, projecting outside these pieces $i$. The two parts $i$ $i$ constitute two jaws which seize the wire, only permitting of the passage of the length necessary to be upset in order to form the head; these jaws $i$ $i$ form by their juxtaposition a conical cavity at the base of the projecting portion of the wire, which cavity, together with the cap-shaped cavity of the punch $i^1$, determines the form of the spoke head. The two jaws $i$ $i$ are actuated by levers $i^2$ pivoted at $i^3$ and operated by two cams $i^4$ on the main shaft L; the connection of the levers $i^2$ with the jaws $i$ $i$ is effected by means of rods $i^5$ which permit these jaws, which are suitably guided, to receive a rectilinear movement in spite of the circular arc described by the levers $i^2$.

The punch $i^1$ is fixed to a suitably guided slide block which receives a movement of advance toward the wire by means of a roller $i^7$ fixed in the interval between the two plates forming the cams $i^4$ and $g^4$; this roller, acts upon a lever $i^8$, which acts upon the extremity of the slide block $i^6$ provided with an adjustable tappet $i^9$.

The slide block $i^6$ with its punch $i^1$ is acted upon in the reverse direction by an arm $i^{10}$ pivoting at $i^{11}$ upon one of the levers $i^2$ and which is situated between a fixed stop $i^{12}$ and a roller of the said slide block.

The operation of this machine is as follows:—The wire A coming from a reel arranged in proximity, is engaged between the straightening rolls B B¹, then in the retaining member C, in the open rolling appliances D and E and in the part F brought to the end of its travel near this latter.

When the machine begins to act, the succession of operations is as follows: The pincers F presses the wire, the arm $f^2$ being brought from $x$ to $y$ by the action of the bar $f^9$ (Figs. 1 and 5), the rolling devices D and E press the wire between their rolls (Fig. 3) owing to the action of the cam plate J upon the levers $d^4$ and $e^4$, the pincers F are displaced by the rod $f^{19}$ and then the wire passing through the rollers D and E which are brought together is made of the reduced diameter $a^1$ (Fig. 10) being first of all converted by the rolls D from its original circular cross section to an elliptical section, and then by means of the rolls E reconverted into a circular cross section forming the part $a^1$ which constitutes the main body of the spoke; a little before the end of the travel of the pincers F the rolls D and E open and permit of the passage of the wire without acting upon it, that is to say they permit it to remain of its initial diameter $a$ (Fig. 10); a certain quantity of wire of the original diameter thus leaves the rolls, then the pincers F having completed their travel again seize the wire around this length of the initial diameter and effects a fresh tractive effort, the rolls being again closed so as to form a fresh length of reduced diameter $a^1$; the extremity of the wire then reaches the appliance for forming the head; while the pincers F are returning toward the rolls the head is formed; in order to effect this operation the jaws $i$ $i$ seize the wire which projects slightly from them and the punch $i^1$ advances and upsets this projecting portion, thus forming the head (Figs. 8 and 9). In this condition of the operation the length of wire engaged in the machine is that represented in Fig. 10; the two parts $a$ $a$ of the original diameter comprised between the extremities of the wire engaged are each equal to the total of the lengths of two reinforced parts of a spoke plus the length necessary for the formation of the head.

When the head is formed, the shears G actuated by the shaft $g$, cuts the wire at $z$ in the piece $a$ of the initial diameter and the spoke $A^1$ being then finished falls from the machine; the guide H, which during the advance of the wire has remained closed in order to guide it, opens for this purpose so as to permit of the fall of the finished spoke into a receptacle M. During the head-forming operation, the pincers F have returned close to the rolls so as to again seize the wire of initial diameter; during this return movement, the inevitable friction of the pincers upon the wire might draw this latter back but this is obviated by the part C which acts in the manner of a pawl; the machine is now regularly operative and the various operations are reproduced in the manner explained, each out and home stroke of the pincers F then corresponding to the formation of a spoke.

It will be noted that the travel of the pincers F determines the length of the spoke and that the action of the cam plate J upon the rolls determines the length of the portion of reduced diameter; in this manner by regulating the various parts provided for this purpose, it is possible to produce spokes of different dimensions.

It will of course be understood that this machine may comprise various modifications of construction and of detail, suggested by mechanical practice and not introducing any change in the main dispositions.

What I claim and desire to secure by Letters Patent of the United States is:—

1. A machine of the character described, having a driving shaft, a wire forming device comprising a succession of suitably arranged pairs of idler rolls, one member of each pair being mounted in a stationary bearing and the other member of each pair being mounted in a pivoted bearing, means controlled by said driving shaft, for separating said idler rolls at predetermined intervals by swinging the roll mounted in pivoted bearing away from its mate, in combination with means actuated by said driving shaft for intermittently seizing the wire and drawing the same through said forming device, substantially as described.

2. In a machine of the character described, a frame, a driving shaft arranged transversely across one end thereof, a wire forming device comprising a succession of pairs of idler rolls arranged lengthwise of said frame, one member of each pair being mounted in a stationary bearing and the other member of each pair being mounted on a pivoted lever, a spindle geared to said driving shaft and extending lengthwise of said frame, means in connection with said spindle for actuating said pivoted levers at predetermined intervals to separate the rolls of each pair, in combination with means actuated by said driving shaft for intermittently seizing the wire and drawing the same through said forming device, substantially as described.

3. In a machine of the character described, a frame, a driving shaft arranged transversely thereof, a wire forming device and means for pulling the wire through said forming device, said means comprising gripping jaws mounted to slide lengthwise of said frame, an oscillating lever controlling the grip of said jaws, a second oscillating lever to impart sliding motion to said jaws, and means in connection with said driving shaft for actuating said oscillating levers, substantially as described.

4. In a machine of the character described, a frame, a driving shaft arranged transversely thereof, a wire forming device and means for pulling the wire through said forming device, said means comprising a rod sliding lengthwise of said frame, a gripping jaw mounted in fixed position thereon, a coacting gripping jaw pivoted with relation thereto, an oscillating lever actuated by said driving shaft and operating said pivoted jaw, and a second oscillating lever to impart sliding motion to said rod and gripping jaws, substantially as described.

5. In a machine of the character described, a frame, a driving shaft arranged transversely thereof, a wire forming device controlled therefrom, means operated by said shaft for drawing the wire through said forming device and cutting means for severing a section of the wire after it has been formed, said cutting means comprising a stationary and a movable blade, an oscillating spindle operatively connected to said movable blade and cam means in connection with said driving shaft for actuating said oscillating spindle, substantially as described.

6. In a machine of the character described, a frame, a driving shaft arranged transversely thereof, a wire forming device controlled therefrom, means operated by said shaft for drawing the wire through said forming device together with a heading device actuated by said driving shaft and comprising a longitudinally movable punch, and transversely movable jaws for holding the wire while the head is being formed.

7. A machine of the character described, comprising a frame, a driving shaft with cams thereon at one end, a roller device for forming the body of the spoke, means for drawing the wire through said roller device operated from a cam on said shaft, a heading device for forming a head on the spoke, comprising a longitudinally movable punch, means connecting said punch with said driving shaft for actuating the former, transversely movable jaws for holding the wire while the head is being formed, and a cutting device between said heading means and roller device.

In testimony whereof I have signed my name to this specification, in the presence of two subscribing witnesses.

EUGÈNE LOUIS ROBERGEL.

Witnesses:
 GUSTAVE DUMONT,
 HANSON C. COXE.